United States Patent
Lee et al.

Patent Number: 5,963,220
Date of Patent: Oct. 5, 1999

[54] MIP MAP/RIP MAP TEXTURE LINEAR ADDRESSING MEMORY ORGANIZATION AND ADDRESS GENERATOR

[75] Inventors: Ruen-Rone Lee, Hsinchu; Chun-Kai Huang, Taichung; Wei-Kuo Chia, Hsinchu, all of Taiwan

[73] Assignee: Industrial Technology Research Institute, Hsinchu, Taiwan

[21] Appl. No.: 08/598,523

[22] Filed: Feb. 8, 1996

[51] Int. Cl.$^6$ ................................... G06T 1/60
[52] U.S. Cl. ................... 345/507; 345/430; 345/516
[58] Field of Search .................. 345/425, 516, 345/430, 515, 507, 431

[56] References Cited

U.S. PATENT DOCUMENTS

| | | |
|---|---|---|
| 5,046,023 | 9/1991 | Katsura et al. . |
| 5,185,856 | 2/1993 | Alcorn et al. . |
| 5,222,205 | 6/1993 | Larson et al. . |
| 5,268,681 | 12/1993 | Lin et al. . |
| 5,268,682 | 12/1993 | Yang et al. . |
| 5,321,425 | 6/1994 | Chia et al. . |
| 5,422,657 | 6/1995 | Wang et al. . |
| 5,495,563 | 2/1996 | Winser ..................................... 345/430 |
| 5,606,650 | 2/1997 | Kelley et al. ........................... 345/430 |

OTHER PUBLICATIONS

L. Williams, *Pyramidal Parametrics*, Computer Graphics, vol. 17, No. 3, pp. 1–11, Jul., 1983.

W. Newman & R. Sproull, Principles of Interactive Computer Graphics, ch. 25, pp. 389–410 (1979).

*Primary Examiner*—Richard A. Hjerpe
*Assistant Examiner*—Francis N. Nguyen
*Attorney, Agent, or Firm*—Proskauer Rose LLP

[57] ABSTRACT

A linear address organization for physically storing mip maps and rip maps in memory is disclosed. The subsampled data arrays of the mip maps and rip maps are sequentially stored in continuous subsequences of a continuous sequence of memory addresses. The subsequences of addresses are assigned in order of level of subsampling of the data arrays which make up the mip map or rip map. In the case of a mip map, the subsequences are assigned to the data arrays in order of increasing level of subsampling. In the case of rip maps, the data arrays are segregated into groups according to a first one of the two subsampling directions, such that each array in a particular group has the same level of subsampling in the first direction. Subsequences are assigned to each group of data arrays. The addresses of the subsequences are assigned within each group on a span by span basis where a span includes the texture data in a particular direction of each data array in order of increasing level in the second one of the two subsampling directions.

Address generators are also disclosed for assisting in generating linear addresses to texture data with specific coordinates (u,v) in arrays having particular levels of subsampling.

14 Claims, 6 Drawing Sheets

| MEMORY | MEMORY ADDRESS |
|---|---|
| 250-(0,0) | BASE |
| 250-(1,0) | BASE + 1 |
| ⋮ | ⋮ |
| 250-(7,0) | BASE + 7 |
| 251-(0,0) | BASE + 8 |
| 251-(1,0) | BASE + 9 |
| ⋮ | ⋮ |
| 251-(3,0) | BASE + 11 |
| 252-(0,0) | BASE + 12 |
| 252-(1,0) | BASE + 13 |
| 253-(0,0) | BASE + 14 |
| 250-(0,1) | BASE + 15 |
| 250-(1,1) | BASE + 16 |
| ⋮ | ⋮ |
| 250-(7,1) | BASE + 22 |
| 251-(0,1) | BASE + 23 |
| 251-(1,1) | BASE + 24 |
| ⋮ | ⋮ |
| 251-(3,1) | BASE + 26 |
| 252-(0,1) | BASE + 27 |
| 252-(1,1) | BASE + 28 |
| 253-(1,0) | BASE + 29 |
| ⋮ | ⋮ |
| 253-(0,7) | BASE + 119 |
| 254-(0,0) | BASE + 120 |
| 254-(1,0) | BASE + 121 |
| ⋮ | ⋮ |
| 254-(7,0) | BASE + 127 |
| 260-(0,0) | BASE + 128 |
| 260-(1,0) | BASE + 129 |
| ⋮ | ⋮ |
| 260-(3,0) | BASE + 131 |
| 261-(0,0) | BASE + 132 |
| 261-(1,0) | BASE + 133 |
| 262-(0,0) | BASE + 134 |
| 254-(0,1) | BASE + 135 |
| 254-(1,1) | BASE + 136 |
| ⋮ | ⋮ |
| 254-(7,1) | BASE + 142 |
| 260-(0,1) | BASE + 143 |
| 260-(1,1) | BASE + 144 |
| ⋮ | ⋮ |
| 260-(3,1) | BASE + 146 |
| 261-(0,1) | BASE + 147 |
| 261-(1,1) | BASE + 148 |
| 262-(0,1) | BASE + 149 |
| ⋮ | ⋮ |
| 262-(0,3) | BASE + 179 |
| ⋮ | ⋮ |
| 280-(0,0) | BASE + 224 |
| ⋮ | ⋮ |

$TLA_{(M)} = BASE + GO + u + 2^{ML-d} \cdot v$ $TLA_{(R)} = B + (v + GOv)RSL + GOu + u$

MIP MAP/RIP MAP TEXTURE LINEAR ADDRESSING MEMORY ORGANIZATION AND ADDRESS GENERATOR

RELATED APPLICATIONS

The following patents and patent applications are commonly assigned to the assignee of this application and contain subject matter related to this application:

1. patent application Ser. No. 08/598,522, entitled, "Virtual Coordinate To Linear Physical Memory Address Converter For Computer Graphics System," filed for Erh-Chia Wang, Wei-Kuo Chia, and Chun-Yang Cheng on even date herewith;

2. patent application Ser. No. 08/598,520, entitled, "Blending Apparatus for Computer Graphics System," filed for Jan-Han Hsiao, Wei-Kuo Chia and Chun-Kai Huang on even date herewith;

3. U.S. patent application Ser. No. 08/598,521, entitled "Texture Filter Apparatus for Computer Graphics System," filed for Yu-Ming Lin, Chun-Kai Huang, Wei-Kuo Chia on even date herewith;

4. U.S. Pat. No. 5,422,657, entitled, "A Graphics Memory Architecture For Multi-mode Display System," filed for Shu-Wei Wang, Wei-Kuo Chia, Chun-Kai Huang and Chun-Chie Hsiao on Sep. 13, 1993;

5. U.S. Pat. No. 5,321,425, entitled, "Resolution Independent Screen Refresh Strategy," filed for Wei-Kuo Chia, Jiunn-Min Jue, Gen-Hong Chen and Chih-Yuan Liu on Feb. 19, 1992;

6. U.S. Pat. No. 5,268,682, entitled, "Resolution Independent Raster Display System," filed for Wen-Jann Yang, Chih-Yuan Liu and Bor-Chuan Kuo on Oct. 7, 1991; and 7. U.S. Pat. No. 5,268,681, entitled, "Memory Architecture With Graphics Generator Including A Divide By Five Divider," filed for Cheun-Song Lin, Bor-Chuan Kuo and Rong-Chung Chen on Oct. 7, 1991.

The contents of the above-listed patents and patent applications are incorporated herein by reference.

FIELD OF THE INVENTION

The present invention relates to graphics controllers in computer systems. In particular, the present invention relates to rendering 3-D objects with a specified texture. Texture data is often stored as plural progressively subsampled arrays of data from which interpolated texture values may be generated. The present invention is specifically directed to a novel manner of linearly storing the texture data arrays in memory and for generating addresses to the texture data in desired data arrays.

BACKGROUND OF THE INVENTION

FIG. 1 depicts a conventional computer system 10. The computer system 10 has a processor 12, a main memory 14, a disk memory 16 and an input device 18, such as a keyboard and mouse. The devices 12–18 are connected to a bus 20 which transfers data, i.e., instructions and information, between each of these devices 12–18. A graphics controller 30 is also connected to the bus 20. As shown, the graphics controller 30 includes a drawing processor 32. The drawing processor is also connected to an address generator 36 and a data input of a frame buffer 34. The address generator 36, in turn, is connected to RAS (row address select), CAS (column address select) and chip select inputs of the frame buffer 34. Illustratively, the frame buffer 34 is implemented with plural VRAMs (video random access memories) or DRAMs (dynamic random access memories). The frame buffer 34 is connected to a display device 38, such as a cathode ray tube (CRT) or liquid crystal display (LCD) monitor.

The drawing processor 32 receives instructions from the processor 12 for drawing objects. For instance, in the case of a computer aided design (CAD) application, the processor 12 may receive user input regarding creating and locating objects in 3-D space. The processor 12, in turn, transfers instructions regarding the size, location, texture, translucence, etc. of such objects to the drawing processor 32. In response, the drawing processor 32 creates a pixel image representation of a plane of view of such objects in 3-D space. The pixels of the image of each plane of view form part of a frame that is stored by the drawing processor 32 in the frame buffer 34. Several drawing processors 32 are known, such as is disclosed in U.S. Pat. Nos. 5,046,023 and 5,185,856. The latter reference discloses a drawing processor that is specifically adapted for rendering 3-D objects.

A computer system 10 capable of performing 3-D rendering advantageously "maps" texture onto the rendered object. The mapping of texture onto objects is well known and is not discussed in detail herein. See U.S. Pat. No. 5,222,205; L. Williams, *Pyramidal Parametrics*, ACM COMPUTER GRAPHICS, vol. 17, no.3 p.1–11 (1983); and W. NEWMAN & R. SPROULL, PRINCIPLES OF INTERACTIVE COMPUTER GRAPHICS, 2d ed., p. 389–410. Suffice it to say that the texture pattern may be considered a renderable source texture surface which is to be mapped onto a destination object surface. The object thus formed may then be mapped onto the destination plane of view.

Such mapping is very computation intensive. As noted in the above-noted Williams article, such mapping may require sampling the texture data in a fashion which is suited to the view of the surface of the destination object. That is, the visibility of the texture detail on the object surface depends on how close or how far the object surface is located in 3-D space from the plane of view. As the plane of view is brought closer to the object surface, more texture detail is visible. As the plane of view is move away from the object surface, less texture detail is visible.

To reduce the amount of computation involved in mapping texture when the object is moved closer or farther from the plain of view, the Williams article proposes to initially provide subsamplings of the textured data. This is illustrated in FIG. 2. As shown, the texture data is stored in 2-D data arrays. The texture data in each array is indexed, i.e., addressed with 2-D virtual address coordinates (u,v), i.e., one in each direction U and V. The texture data consists of RGB data including one fixed length data unit (e.g., byte) for each color red (R), green (G) and blue (B) per point of texture data. The R data is stored in array 61, the G data is stored in array 62 and the B data is stored in array 63. As per the Williams memory storage scheme, the array 64 is used for storing subsampled versions of the RGB data. For instance, subarray 71 of array 64 stores a ½ subsampling in both the U and V directions of the R data of array 61. Likewise, subarray 72 stores a ½ subsampling in both the U and V directions of the G data of array 62. Subarray 73 stores a ½ subsampling in both the U and V directions of the B data of array 63. The subsampling process is then carried out again in subarray 74 which has subarrays 81, 82 and 83 which contain ¼ subsamplings in both the U and V directions of the R,G, and B data of arrays 61, 62 and 63, respectively. Likewise, subarrays 91, 92 and 93 of subarray 84 contain ⅛ subsamplings in both the U and V directions of the R,G and B data arrays 61, 62 and 63, respectively. This subsampling is carried out until one texture data per color is obtained. This data structure 51 is referred to as a "mip map." In a mip map 51, the full scale RGB data (in arrays 61, 62 and 63) is said to be subsampled at level d=0, the ½ subsampled RGB data (in arrays 71, 72 and 73) is said to be subsampled at level d=1, and so on. In general, the $2^{-d}$ subsampled data is said to be subsampled at level d.

In order to map texture data onto an object, the appropriate level RGB texture data array is used. Alternatively, if the object surface size is between two arrays that are subsampled at levels d and d+1, a bilinear interpolation between the texture data of the two data arrays is used. The mip map scheme therefore provides a relatively low computation manner of mapping texture onto an arbitrary sized object surface.

Consider now the case where the object is both displaced away from, and rotated with respect to, the plane of view. The mip map can still be used to map texture on to the object surface. However, because the object surface has rotated, the interpolated texture values produced using the mip map may produce aliasing or blurring artifacts in the image. To remedy this problem, U.S. Pat. No. 5,222,205 proposes a modified data structure referred to as a "rip map." A rip map 52 is illustrated in FIG. 3. Illustratively, the rip map 52 shown in FIG. 3 is for the R texture data. Therefore, a rip map for the G and B data would also be provided.

The rip map 52 has a full scale data array 61' including one R value for each pixel of the object surface. Like the mip map 51, the rip map 52 also includes plural subsampled versions of the full scale data array 61'. However, the subsampled arrays of the rip map 52 need not be sampled in each direction U and V the same. For instance, data array 62' is ½ subsampled only in the direction U. Data array 63' is ¼ subsampled only in the direction U. Data array 64' is ⅛ subsampled only in the direction U, and so on. Likewise, data array 65' is ½ subsampled only in the direction V, data array 66' is ¼ subsampled only in the direction V and data array 67' is ⅛ subsampled only in the direction V. The rip map contains other permutations of subsampling, such as data array 75' which is ½ subsampled in the direction U and ⅛ subsampled in the direction V. Two levels of subsampling (du,dv) are therefore used to designate a specific data array. The following table summarizes the assignment of levels to the subsampled data arrays:

TABLE 1

| Label | du | dv | u dir. sampl. | v dir. sampl. |
|-------|----|----|---------------|---------------|
| 61'   | 0  | 0  | 1             | 1             |
| 62'   | 1  | 0  | 1/2           | 1             |
| 63'   | 2  | 0  | 1/4           | 1             |
| 64'   | 3  | 0  | 1/8           | 1             |
| 65'   | 0  | 1  | 1             | 1/2           |
| 66'   | 0  | 2  | 1             | 1/4           |
| 67'   | 0  | 3  | 1             | 1/8           |
| 71'   | 1  | 1  | 1/2           | 1/2           |
| 72'   | 2  | 1  | 1/4           | 1/2           |
| 73'   | 3  | 1  | 1/8           | 1/2           |
| 74'   | 1  | 2  | 1/2           | 1/4           |
| 75'   | 1  | 3  | 1/2           | 1/8           |
| 81'   | 2  | 2  | 1/4           | 1/4           |
| 82'   | 3  | 2  | 1/8           | 1/4           |
| 83'   | 2  | 3  | 1/4           | 1/8           |
| 91'   | 3  | 3  | 1/8           | 1/8           |
|       | du | dv | $2^{-du}$     | $2^{-dv}$     |

The rip map 51 provides more choices in subsampled data for use in the interpolation. This tends to reduce the aforementioned aliasing and blurring artifacts.

Desirably, RGB texture data is supplemented with alpha data A to form RGBA data for each pixel. The A data may indicate, for instance, the property of "translucence" or the amount of incident light that can pass through the object. For instance, suppose an object models a green lens which passes 80% of the light incident thereon. If such a lens is placed in front of other objects in the background with respect to the plane of view, then the occluded pixels of the objects should have a blended color. In particular, the occluded object pixels should have a color which is 80% of their original color and 20% of the color of the green lens.

Both mip maps and rip maps are useful in reducing the amount of computation for mapping texture data onto an object surface. However, the mip map can only accommodate three data values per pixel, namely, RGB. Alpha data cannot be accommodated in the mip map shown in FIG. 2. In addition, both the mip map and rip map are implemented using 2-D virtual coordinate addresses. However, if such 2-D addresses are used to organize the physical storage of the texture data in the VRAMs/DRAMs of the frame buffer, then much of the storage capacity of the VRAMs/DRAMs tends to be wasted. This is illustrated in FIG. 4. As shown in FIG. 4, the two dimensions of the texture data rarely conform to the dimensions of the memory array of the VRAMs/DRAMs. For instance, the suppose texture data has the same dimensions of a display frame, such as 900×1152. Two banks of four VRAMs/DRAMs each are used to store the texture data in an interleaved fashion. Nevertheless, the shaded areas of the VRAMs/DRAMs are wasted. See U.S. Pat. Nos. 5,321,425, 5,268,682, and 5,268,681.

It is therefore an object of the present invention to overcome the disadvantages of the prior art.

SUMMARY OF THE INVENTION

This and other objects are achieved by the present invention. The present invention is illustratively used in a computer system environment. Illustratively, the computer system includes a processor, main memory, disk memory and data input device, such as a keyboard and mouse, all of which are connected to a bus. Also connected to the bus is a graphics controller which includes a drawing processor and an address generator. The drawing processor renders 3-D objects and maps texture data onto the rendered objects. The address generator, amongst other things, assists the drawing processor in determining the addresses of texture data which may be stored in main memory, disk memory or a frame buffer.

According to one embodiment, the texture data is organized into plural subsampled data arrays, e.g., a mip map or a rip map. However, the storage of the texture data in the memory, e.g., the frame buffer, is not physically organized according to the 2-D virtual address coordinates in texture space. Rather, the storage of the texture data is organized according to linear addresses. Simply stated, the texture data arrays are stored in a continuous sequence of linear memory addresses. The texture data of the data arrays is sequentially stored in subsequences of the sequence of linear memory addresses. The subsequences are assigned to respective texture data according to the order of subsampling of the data arrays.

For example, in the case of a mip map, each data array has a different level of subsampling which is the same in both directions of the data array. One subsequence of addresses is assigned to each data array in order of increasing level of subsampling. That is, the data array which is subsampled by 1 (level 0) is stored in the first subsequence of addresses, the data array which subsampled ½ (level 1) in both directions is assigned the second subsequence of addresses, the data array which is subsampled ¼ (level 2) in both directions is assigned the third subsequence of addresses, etc. In the case of a rip map, the data arrays are each subsampled with a different combination of levels of subsampling du and dv in the directions U and V. The rip map data arrays are segregated into groups according to a first one of the two levels of subsampling, e.g., dv, such that each array in a particular group has the same first level of subsampling. For example, all data arrays with dv=0 form a first group, all data arrays with dv=1 form a second group, etc. Each group has one span for each possible coordinate value in the first direction, e.g., the direction V, in the domain of coordinate values of texture data in the data arrays of the group. For instance, suppose that the domain of coordinate values of the texture data in group one, in the direction V, is 0,1,2 and 3. Then group one has four spans, namely, one span for each value 0,1,2 and 3 in the domain of coordinate v in group one. Each span is a sequence, including one subsequence of texture data from each data array, which subsequences of texture data are arranged in order of the second level (e.g., du) of subsampling of the data arrays. Each subsequence of data includes the texture data of a respective array that has the same coordinate in the first direction (e.g., V) as the span, arranged in order of increasing coordinate in the second direction (e.g., U). For instance, in the case of the row-span for row v=2, the row-span includes one row of data from each data array, i.e., the data (2,0), (2,1), (2,2), . . .

According to another embodiment, an address generator is provided for accessing the texture data of a given level of subsampling of a mip map which is stored at linear memory addresses as described above. Illustratively, the address generator evaluates the following:

$$TLA_{(m)} = \text{Base} + LO + GO$$

$$LO = 2^{ML-d} \cdot v + u$$

$$GO = \begin{cases} \sum_{i=ML-d+1}^{ML} 4^i, & \text{if } d \neq 0 \\ 0, & \text{if } d = 0 \end{cases}$$

where

Base is a base address in which a first texture data corresponding to coordinates (u=0, v=0) in the first array of level d=0 are stored, i is an integer index, GO is a global offset, LO is a local offset, ML is the maximum level of subsampling, d is the depth of subsampling of the data array to be accessed, and u,v are the 2-D virtual address coordinates of the texture data to be accessed.

The address generator has adder circuitry for receiving a base address Base, the global offset GO, u and $2^{ML-d} \cdot v$. The adder circuitry adds Base to GO to produce a first sum. The adder circuitry also adds u to $2^{ML-d} \cdot v$ to produce a second sum representing the local offset LO. Furthermore, the adder circuitry adds the first and second sums to produce the linear memory address of the texture data.

According to another embodiment, an address generator is provided for accessing the texture data of a given level of subsampling of a rip map which is stored at linear memory addresses as described above. Illustratively, the address generator evaluates the following:

$$TLA_{(R)} = \text{Base} + GO$$

$$GO = (2^{ML+1} - 1)GV + GU$$

$$GU = GOU + u$$

$$GV = GOV + v$$

$$GOU = \begin{cases} \sum_{i=ML-du+1}^{ML} 2^i & \text{if } du \neq 0 \\ 0 & \text{if } du = 0 \end{cases}$$

$$GOV = \begin{cases} \sum_{j=ML-dv+1}^{ML} 2^j & \text{if } dv \neq 0 \\ 0 & \text{if } dv = 0 \end{cases}$$

where

Base is a base address in which a first texture data corresponding to coordinates (u=0,v=0) in the first array of level (du=0,dv=0) are stored, GO is a global offset, GV is a total v offset, GOV is a global v offset, GU is a total u offset, GOU is a global u offset, ML is the maximum level of subsampling in both directions u and v, du, dv are the levels of subsampling of the data array to be accessed, u,v are the 2-D virtual address coordinates of the texture data to be accessed, and i and j are integer indexes.

The address generator has a first adder stage for adding v to the first global offset GOV to produce a first sum, and for adding u to the second global offset GOU to produce a second sum. The address generator also has a concatenator circuit for concatenating the first and second sums to produce a concatenated sum. The first sum forms a most significant fragment of a partial concatenated sum and the second sum forms a least significant fragment of the partial concatenated sum. A second adder stage is provided for adding the concatenated sum to Base to produce the linear address.

According to yet another embodiment, a combined address generator is provided for accessing the texture data in either a mip map or a rip map. The address generator according to this embodiment has a first multiplexer stage, receiving, as selectable inputs, the base address Base, the global offset GO in a mip map, the first global offset GOV in a rip map, the second global offset GOU in a rip map, $2^{ML-d} \cdot v$ and v, and a selector control signal. The first multiplexer stage outputs, in response to the selector control signal, as first, second and third outputs, either Base, GO and $2^{ML-d} \cdot v$, respectively, or v, GOV and GOU, respectively. The address generator also has a first adder stage for adding the first and second outputs of the first multiplexer stage to produce a first sum and for adding u to the third output to produce a second sum. The address generator also has a concatenator circuit for concatenating the first sum to the second sum to produce a concatenated sum. A second multiplexer stage is provided for receiving, as selectable inputs, the first sum, the concatenated sum, the second sum and the base address Base, and the selector control signal. The second multiplexer stage outputs, in response to the selector control signal, as fourth and fifth outputs, either the first sum and the second sum, respectively, or the concatenated sum and Base. The address generator furthermore has a second adder stage for adding the fourth and fifth outputs of the second multiplexer stage to produce the linear memory address.

In short, a linear address organization is provided for physically storing texture address data in memory. Address generators are also provided for accessing the stored texture data. The present invention therefore provides an efficient manner for storing texture data and for accessing the stored texture data.

DETAILED DESCRIPTION OF THE INVENTION

Figure 1:
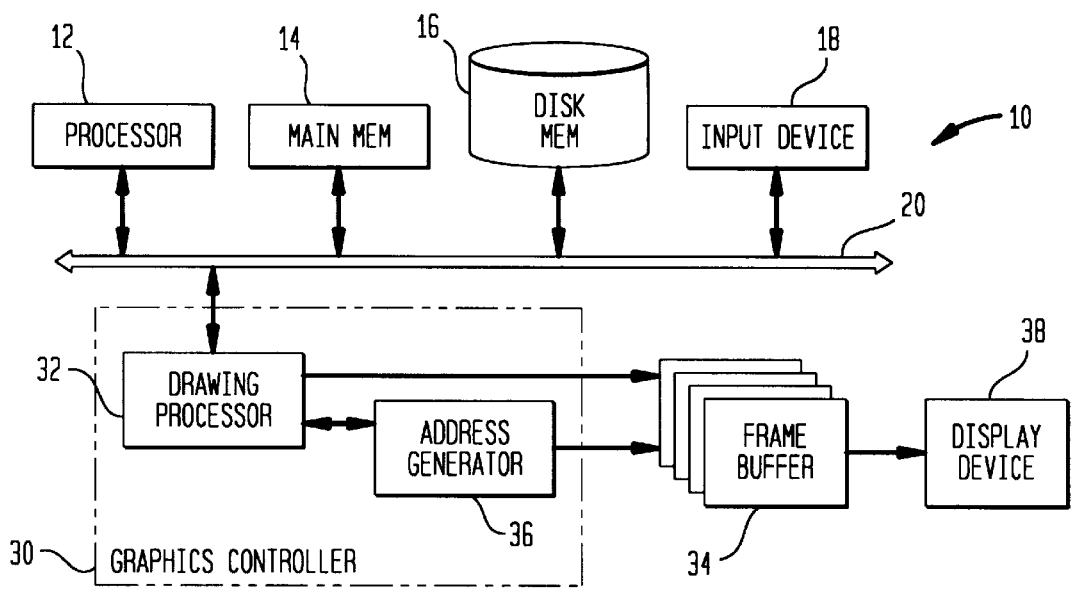
FIG. 1 shows a conventional computer system.
Figure 2:
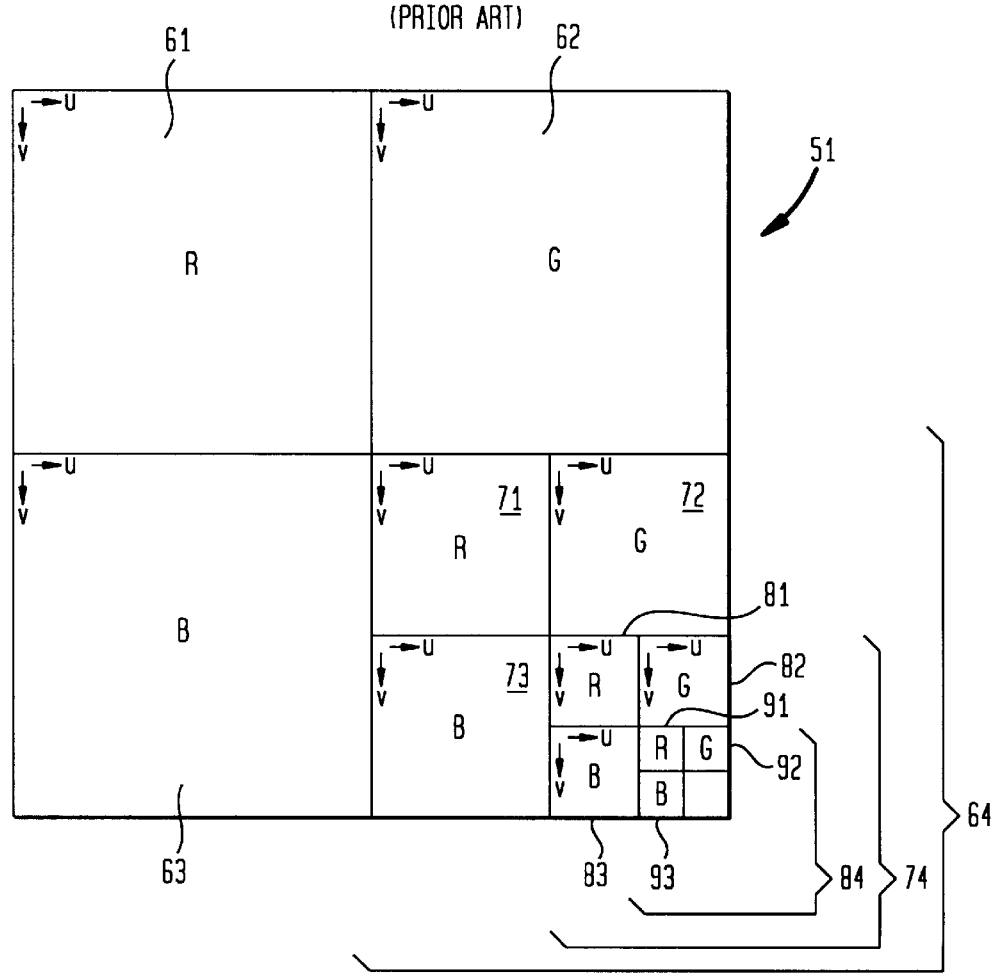
FIG. 2 illustrates a conventional mip map.
Figure 3:
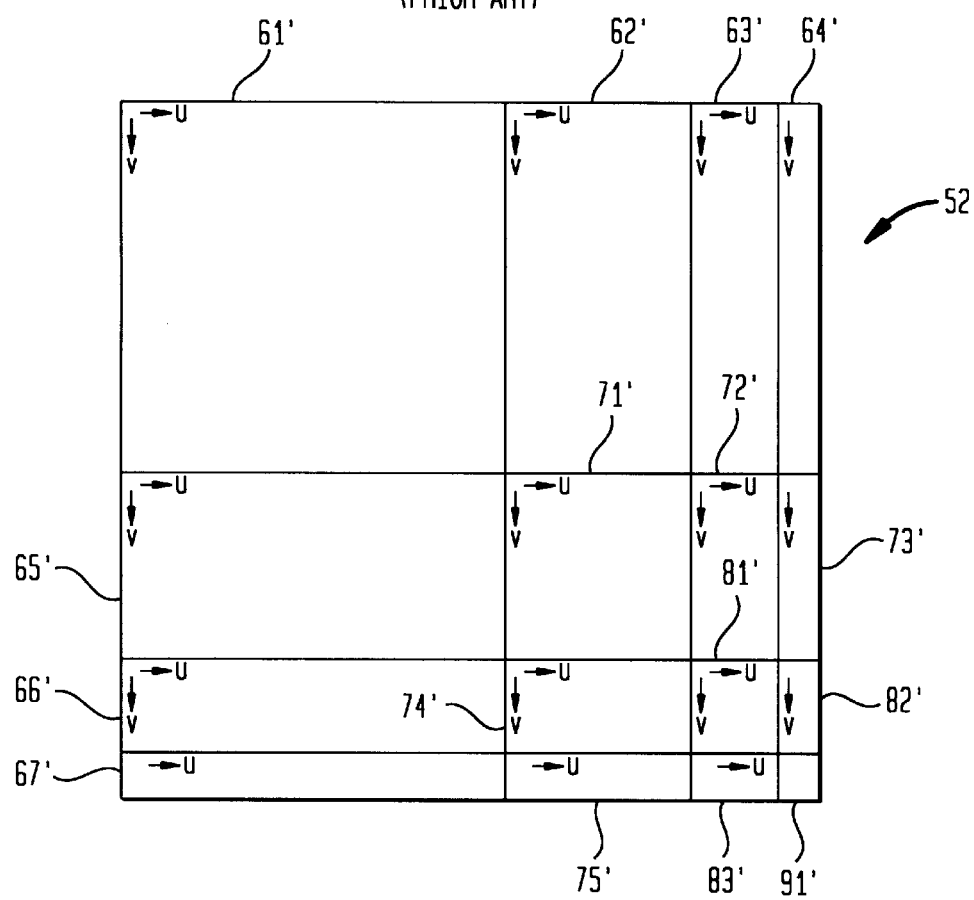
FIG. 3 illustrates a conventional rip map.
Figure 5:
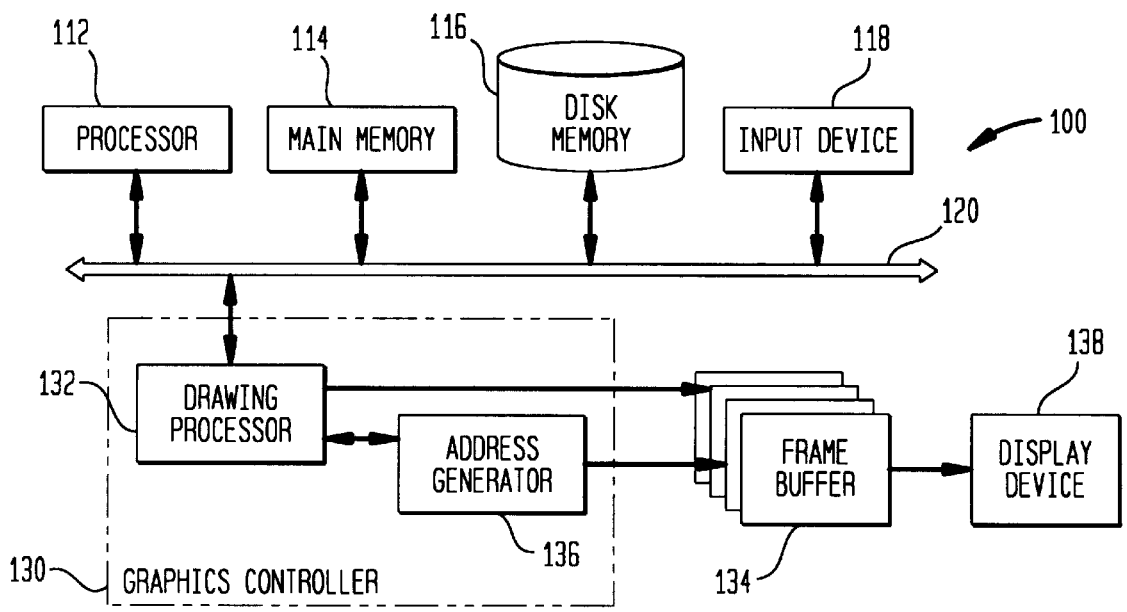
FIG. 5 shows a computer system according to the present invention.
Figure 4:
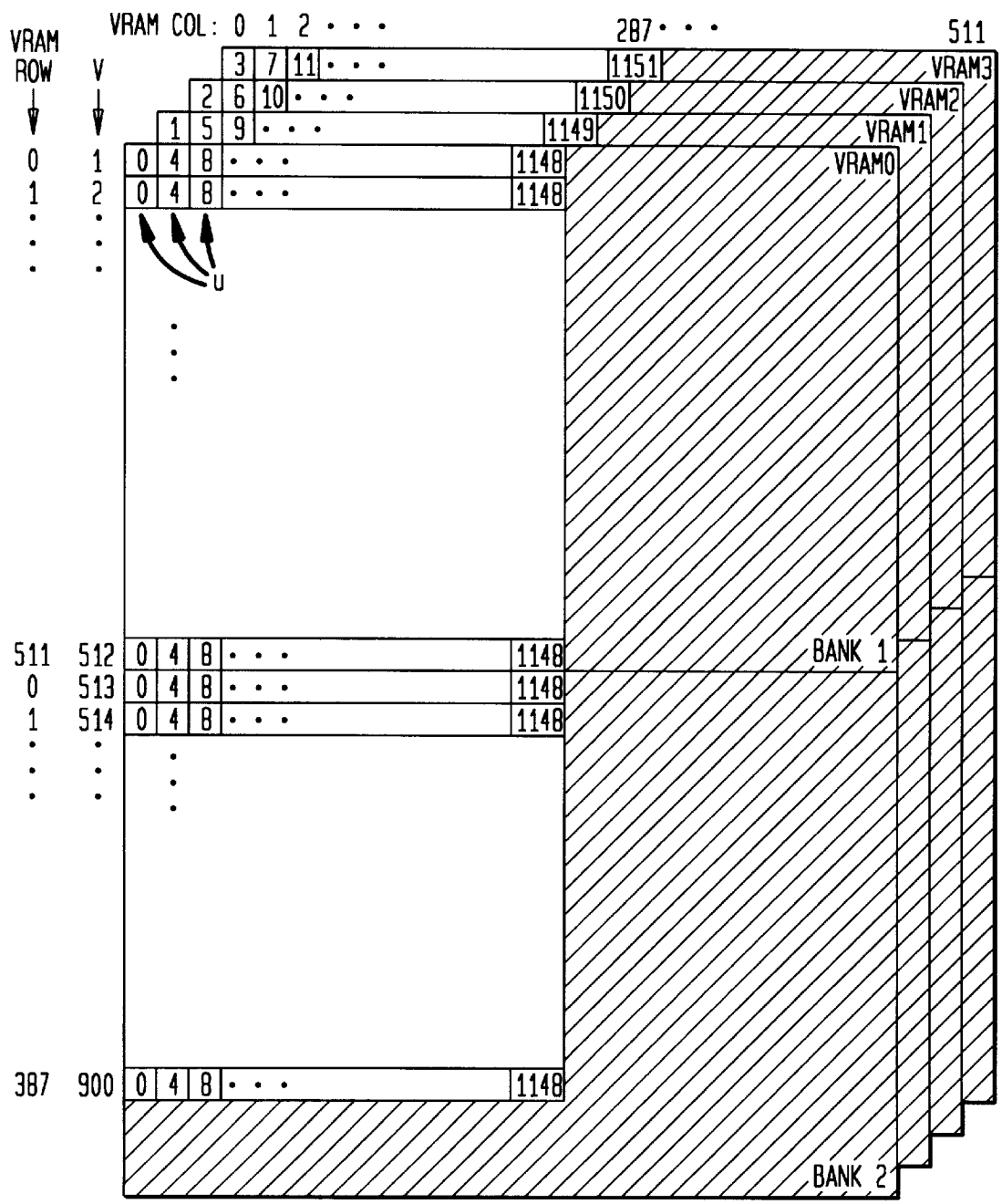
FIG. 4 illustrates a conventional 2-D memory address configuration for physically storing data in memory.

FIG. 5 shows a computer system according to an embodiment of the present invention. As before, the computer system 100 has a processor 112, a main memory 114, a disk memory 116 and an input device 118. Each of these devices is connected to a bus 120. Also connected to the bus 120 is a graphics controller 130. The graphics controller includes a drawing processor 132 and an address generator 136. The drawing processor can output data to the frame buffer 134 while the address generator can output address and chip select information to the frame buffer (e.g., RAS, CAS and chip select). The pixel data stored in the frame buffer is displayed on the display screen of the display device 138.

The drawing processor 132 can output parameters (described below) including 2-D virtual address coordinates and subsampling level(s) of texture data to the address generator 136. The drawing processor 132 can also output control signals to the address generator 136. In response, the address generator 136 outputs to the drawing processor 132 the linear addresses of the desired texture data in physical memory, e.g., the main memory 114, the disk memory 116 or the frame buffer 134. The drawing processor 132 can then use the linear addresses to access the texture data in the main memory 114, disk memory 116 or frame buffer 134 (via the address generator 136). Alternatively, the address generator 136 outputs the physical addresses directly to the main memory 114 or disk memory 116 (via the system bus 120) or to the frame buffer 134. Such data addressing may be utilized by the drawing processor 132 in writing the subsampled texture data into memory, or, more importantly, in reading out the texture data for use in mapping texture onto rendered objects.

Figure 6:
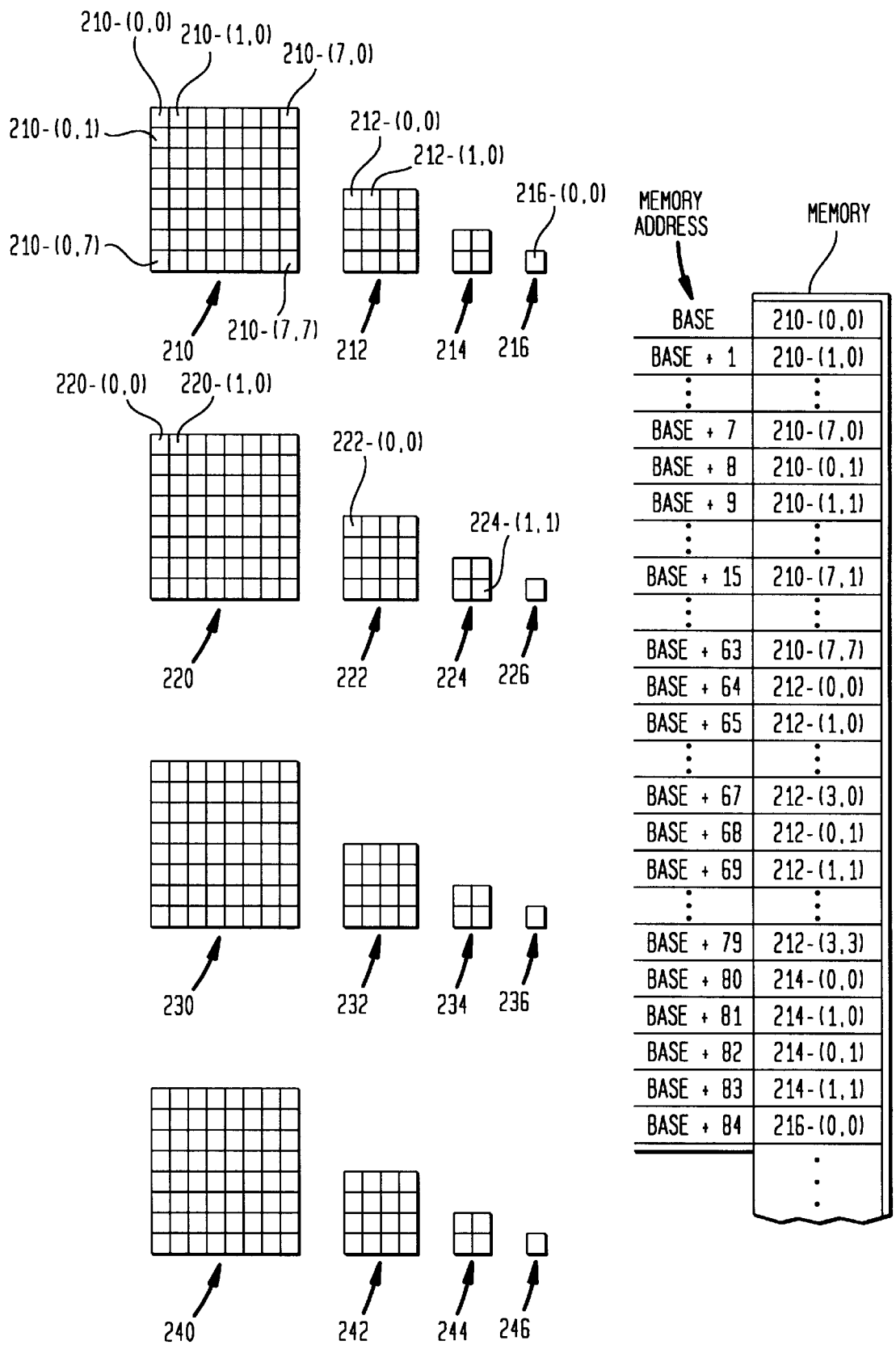
FIG. 6 illustrates a linear memory address organization for physically storing a mip map in memory according to an embodiment of the present invention.

FIG. 6 illustrates a linear addressing organization for physically storing a texture data mip map in memory. For purposes of illustration, it is presumed that the texture data mip map is stored in the main memory 114 (FIG. 5), although the invention also applies to the frame buffer 134 (FIG. 5) and the disk memory 116 (FIG. 5). Suppose the mip map includes a full resolution (subsampling factor of 1) level d=0 of subsampling 2-D data array with 8×8 texture data for each of the colors/alpha R,G,B and A. As shown in FIG. 6, the full resolution arrays are labeled 210 (R), 220 (G), 230 (B) and 240 (A). Each array has data at coordinates (u,v) where u=0,1, . . . ,7 and v=0,1, . . . ,7. The R pixels are labeled 210-(u,v); for example, the data (0,0) is labeled 210-(0,0), the data (0,1) is labeled 210-(0,1). Likewise, the data (u,v) in the G,B and A arrays are labeled 220-(u,v), 230-(u,v) and 240-(u,v). The mip map also has higher level d=1,2 and 3 subsampled arrays for each of the arrays 210, 220 230 and 240. The level 1 subsampled (½ subsampled) R array has 4×4 pixels and is labeled 212. The level 2 subsampled (¼ subsampled) R array has 2×2 pixels and is labeled 214. The level 3 subsampled (⅛ subsampled) R array has 1 pixel and is labeled 216. Likewise, the G,B and A arrays have level 1 subsampled (½ subsampled) arrays 222, 232 and 242, level 2 subsampled (¼ subsampled) arrays 224, 234 and 244 and level 3 subsampled (⅛ subsampled) arrays 226, 236 and 246. As before, texture data in any of the arrays 212, 214, 216, 222, 224, 226, 232, 234, 236, 242, 244 or 246 is referred to with a label which includes the label of the array and the (u,v) coordinates of the texture data. Thus, the G texture data with coordinates (1,1) on level d=2 is labeled 224-(1,1).

According to the linear storage organization, a base memory address "Base" is assigned to each color/alpha. For purposes of illustration, texture data is presumed to include one byte per color/alpha and each memory location is presumed to store one byte. (Note however, that other combinations of texture data precisions and memory capacities can be easily accommodated.) For instance, $Base_R=0$ is assigned to R, $Base_G=85$ is assigned to G, $Base_B=170$ is assigned to B and $Base_A=255$ is assigned to A. The texture data for each color/alpha, e.g., R, is stored at sequential addresses, beginning with $Base_R$, in order of increasing level d. Thus, the texture data of array 210 is stored at memory addresses $Base_R$ to $Base_R+63$. The texture data of array 212 is stored at memory addresses $Base_R+64$ to $Base_R+79$. The texture data of array 214 is stored at memory addresses $Base_R+80$ to $Base_R+83$. The texture data of array 216 is stored at memory address $Base_R+84$. Furthermore, the texture data of each array is stored at continuous sequential memory addresses. For instance, consider the case that row-column ordering is used to store the data. The following table summarizes the assignment of memory addresses to texture data of the arrays 210, 212, 214 and 216:

TABLE 2

| label | addr |
|---|---|
| 210-(0,0) | Base |
| 210-(1,0) | Base + 1 |
| 210-(2,0) | Base + 2 |
| 210-(3,0) | Base + 3 |
| 210-(4,0) | Base + 4 |

TABLE 2-continued

| label | addr |
|---|---|
| 210-(5,0) | Base + 5 |
| 210-(6,0) | Base + 6 |
| 210-(7,0) | Base + 7 |
| 210-(0,1) | Base + 8 |
| 210-(1,1) | Base + 9 |
| 210-(2,1) | Base + 10 |
| 210-(3,1) | Base + 11 |
| 210-(4,1) | Base + 12 |
| 210-(5,1) | Base + 13 |
| 210-(6,1) | Base + 14 |
| 210-(7,1) | Base + 15 |
| 210-(0,2) | Base + 16 |
| 210-(1,2) | Base + 17 |
| 210-(2,2) | Base + 18 |
| 210-(3,2) | Base + 19 |
| 210-(4,2) | Base + 20 |
| 210-(5,2) | Base + 21 |
| 210-(6,2) | Base + 22 |
| 210-(7,2) | Base + 23 |
| 210-(0,3) | Base + 24 |
| 210-(1,3) | Base + 25 |
| 210-(2,3) | Base + 26 |
| 210-(3,3) | Base + 27 |
| 210-(4,3) | Base + 28 |
| 210-(5,3) | Base + 29 |
| 210-(6,3) | Base + 30 |
| 210-(7,3) | Base + 31 |
| 210-(0,4) | Base + 32 |
| 210-(1,4) | Base + 33 |
| 210-(2,4) | Base + 34 |
| 210-(3,4) | Base + 35 |
| 210-(4,4) | Base + 36 |
| 210-(5,4) | Base + 37 |
| 210-(6,4) | Base + 38 |
| 210-(7,4) | Base + 39 |
| 210-(0,5) | Base + 40 |
| 210-(1,5) | Base + 41 |
| 210-(2,5) | Base + 42 |
| 210-(3,5) | Base + 43 |
| 210-(4,5) | Base + 44 |
| 210-(5,5) | Base + 45 |
| 210-(6,5) | Base + 46 |
| 210-(7,5) | Base + 47 |
| 210-(0,6) | Base + 48 |
| 210-(1,6) | Base + 49 |
| 210-(2,6) | Base + 50 |
| 210-(3,6) | Base + 51 |
| 210-(4,6) | Base + 52 |
| 210-(5,6) | Base + 53 |
| 210-(6,6) | Base + 54 |
| 210-(7,6) | Base + 55 |
| 210-(0,7) | Base + 56 |
| 210-(1,7) | Base + 57 |
| 210-(2,7) | Base + 58 |
| 210-(3,7) | Base + 59 |
| 210-(4,7) | Base + 60 |
| 210-(5,7) | Base + 61 |
| 210-(6,7) | Base + 62 |
| 210-(7,7) | Base + 63 |
| 212-(0,0) | Base + 64 |
| 212-(1,0) | Base + 65 |
| 212-(2,0) | Base + 66 |
| 212-(3,0) | Base + 67 |
| 212-(0,1) | Base + 68 |
| 212-(1,1) | Base + 69 |
| 212-(2,1) | Base + 70 |
| 212-(3,1) | Base + 71 |
| 212-(0,2) | Base + 72 |
| 212-(1,2) | Base + 73 |
| 212-(2,2) | Base + 74 |
| 212-(3,2) | Base + 75 |
| 212-(0,3) | Base + 76 |
| 212-(1,3) | Base + 77 |
| 212-(2,3) | Base + 78 |
| 212-(3,3) | Base + 79 |
| 214-(0,0) | Base + 80 |
| 214-(1,0) | Base + 81 |
| 214-(0,1) | Base + 82 |
| 214-(1,1) | Base + 83 |
| 216-(0,0) | Base + 84 |

A like memory address assignment is used for the arrays 220, 222, 224, 226, 230, 232, 234, 236, 240, 242, 244 and 246.

Note that in the example above, each memory array has dimensions which are a power of 2. Therefore, the number of data in an array of level d is $4^{ML-d}$ where ML is the "maximum level" of the mip map (in this case, 3). To determine the linear address of texture data with coordinates (u,v) in an array of level d, a global offset "GO" and a local offset "LO" are added to the base address Base. Thus:

$$TLA_{(M)} = Base + LO + GO$$

GO represents the addresses containing the texture data of the lower level arrays (than the array of level d containing the texture data to be accessed). GO may be determined by:

$$GO = \begin{cases} \sum_{i=ML-d+1}^{ML} 4^i & \text{if } d \neq 0 \\ 0 & \text{if } d = 0 \end{cases}$$

where i is an integer index.

LO represents the textured data in the same array as the data to be retrieved which precedes the data to be retrieved. Assuming row-column ordering, LO may be determined by:

$$LO = 2^{ML-d} \cdot v + u$$

where v and u are the coordinates (u,v) of the data to be accessed and the operation sign "." indicates a multiplication operation between $2^{ML-d}$ and v.

Figure 7:
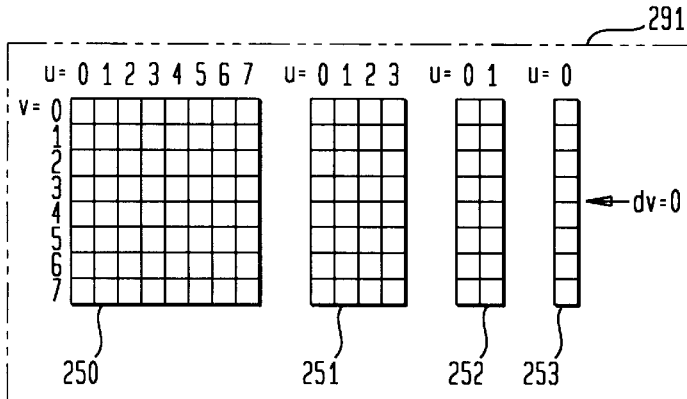
FIG. 7 illustrates a linear memory address organization for physically storing a rip map in memory according to an embodiment of the present invention.
Figure 7:
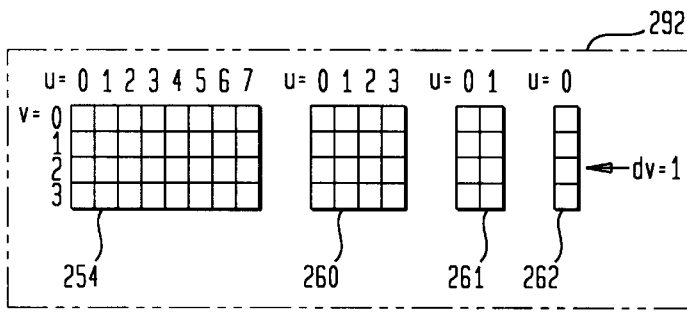
Figure 7:
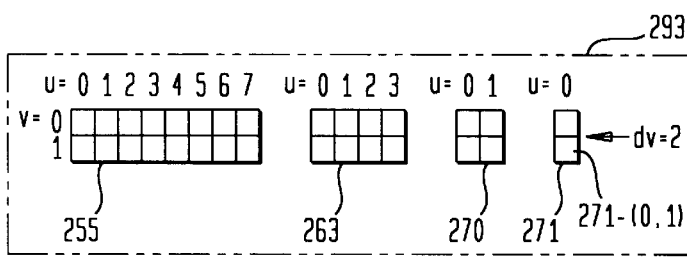
Figure 7:
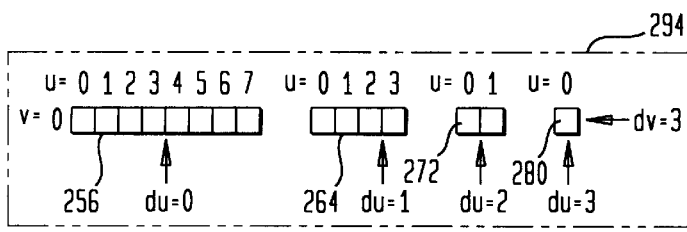

FIG. 7 illustrates the physical storage of a rip map according to a linear addressing organization. For sake of brevity, only the R data is discussed in detail. However, the principles are easily extendible to the G, B and A data. Consider a rip map for the R data. Each array of the rip map has a different permutation of levels of subsampling du, dv in the directions of U and V. Array 250 is subsampled at levels du=0, dv=0 and has 8×8 texture data. Array 251 is subsampled at levels du=1, dv=0 and has 4×8 texture data. Array 252 is subsampled at levels du=2, dv=0 and has 2×8 texture data. Array 253 is subsampled at levels du=3, dv=0 and has 1×8 texture data. Array 254 is subsampled at levels du=0, dv=1 and has 8×4 texture data. Array 255 is subsampled at levels du=0, dv=2 and has 2×8 texture data. Array 256 is subsampled at levels du=0, dv=3 and has 8×1 texture data. Array 260 is subsampled at levels du=1, dv=1 and has 4×4 texture data. Array 261 is subsampled at levels du=2, dv=1 and has 2×4 texture data. Array 262 is subsampled at levels du=3, dv=1 and has 1×4 texture data. Array 263 is subsampled at levels du=1, dv=2 and has 4×2 texture data. Array 264 is subsampled at levels du=1, dv=3 and has 4×1 texture data. Array 270 is subsampled at levels du=2, dv=2 and has 2×2 texture data. Array 271 is subsampled at levels du=3, dv=2 and has 1×2 texture data.

Array 272 is subsampled at levels du=2, dv=3 and has 2×1 texture data. Array 280 is subsampled at levels du=3, dv=3 and has 1×1 texture data. As in FIG. 6, individual texture data are referred to by their array and their respective coordinates (u,v). Thus, the pixel (u=0,v=1) in the array subsampled at du=3, dv=2 is referred to as 271-(0,1).

As shown in FIG. 7, a continuous sequence of linear addresses is assigned to the arrays as follows. First, one of the two levels du or dv is chosen and the arrays themselves are segregated into groups, wherein each array in a given group has the same value for the chosen level. Suppose dv is selected. Four groups 291, 292, 293 and 294 are formed. The first group 291 (for dv=0) includes the arrays 250, 251, 252 and 253. The second group 292 (for dv=1) includes the arrays 254, 260, 261 and 262. The third group 293 (for dv=2) includes the arrays 255, 263, 270 and 271. The fourth group (for dv=3) includes the arrays 256, 264, 272 and 280. One continuous subsequence of addresses is assigned to each group of arrays such that the four subsequences form the continuous sequence of addresses assigned to the rip map. The first group is illustratively assigned the subsequence of addresses Base to Base+119. The second group is assigned the subsequence of addresses Base+120 to Base+179. The third group is assigned the subsequence of addresses Base+180 to Base+209. The fourth group is assigned the subsequence of addresses Base+210 to Base+224.

At least one span of texture data is defined in each group. One span is defined for each value in the domain of the coordinate v (that is, the coordinate in the same direction V as the level of subsampling chosen to use as a basis for segregating the data arrays into groups, namely dv) for texture data in that group. That is, eight spans are defined in the group 291, namely, one for each coordinate value v=0, v=1, v=2, v=3, v=4, v=5 v=6 and v=7. Four spans are defined in group 292, namely, one for each coordinate value v=0, v=1, v=2 and v=3. Two spans are defined in group 293, namely, one for v=0 and one for v=1. One span is defined in group 294 for v=0.

Each span is defined as a sequence of texture data, including one subsequence of texture data from each data array in the respective group. The subsequences of texture data are arranged in order of increasing level du (i.e., the other of the two levels of subsampling du,dv not chosen to use as a basis for segregating the data values into groups). Each subsequence of texture data includes all of the texture data in the respective data array having the same value for coordinate v as the corresponding span. For instance, in the first group, the span for row v=3 includes the data 250-(0,3), 250-(1,3), . . . , 250-(7,3), 251-(0,3), 251-(1,3), . . . , 251-(3,3), 252-(0,3), 252-(1,3), 253-(0,3). (Since, in this illustration, each span includes the data of a respective row of a group, the spans are referred to as "row-spans" below. Note that "column-spans" are also possible.) The addresses of each subsequence are assigned within each group to the sequences of texture data of the row-spans in row-span order from row v=0 to the maximum row number in the respective group. The sequential assignment of linear address to the rip map is summarized below:

TABLE 3

| Data | Address |
| --- | --- |
| 250-(0,0) | Base |
| 250-(1,0) | Base + 1 |
| 250-(2,0) | Base + 2 |
| 250-(3,0) | Base + 3 |

TABLE 3-continued

| Data | Address |
| --- | --- |
| 250-(4,0) | Base + 4 |
| 250-(5,0) | Base + 5 |
| 250-(6,0) | Base + 6 |
| 250-(7,0) | Base + 7 |
| 251-(0,0) | Base + 8 |
| 251-(1,0) | Base + 9 |
| 251-(2,0) | Base + 10 |
| 251-(3,0) | Base + 11 |
| 252-(0,0) | Base + 12 |
| 252-(1,0) | Base + 13 |
| 253-(0,0) | Base + 14 |
| 250-(0,1) | Base + 15 |
| 250-(1,1) | Base + 16 |
| 250-(2,1) | Base + 17 |
| 250-(3,1) | Base + 18 |
| 250-(4,1) | Base + 19 |
| 250-(5,1) | Base + 20 |
| 250-(6,1) | Base + 21 |
| 250-(7,1) | Base + 22 |
| 251-(0,1) | Base + 23 |
| 251-(1,1) | Base + 24 |
| 251-(2,1) | Base + 25 |
| 251-(3,1) | Base + 26 |
| 252-(0,1) | Base + 27 |
| 252-(1,1) | Base + 28 |
| 253-(0,1) | Base + 29 |
| 250-(2,0) | Base + 30 |
| 250-(2,1) | Base + 31 |
| 250-(2,2) | Base + 32 |
| 250-(3,2) | Base + 33 |
| 250-(4,2) | Base + 34 |
| 250-(5,2) | Base + 35 |
| 250-(6,2) | Base + 36 |
| 250-(7,2) | Base + 37 |
| 251-(0,2) | Base + 38 |
| 250-(1,2) | Base + 39 |
| 251-(2,2) | Base + 40 |
| 251-(3,2) | Base + 41 |
| 252-(0,2) | Base + 42 |
| 252-(1,2) | Base + 43 |
| 253-(0,2) | Base + 44 |
| 250-(0,3) | Base + 45 |
| 250-(1,3) | Base + 46 |
| 250-(2,3) | Base + 47 |
| 250-(3,3) | Base + 48 |
| 250-(4,3) | Base + 49 |
| 250-(5,3) | Base + 50 |
| 250-(6,3) | Base + 51 |
| 250-(7,3) | Base + 52 |
| 251-(1,0) | Base + 53 |
| 251-(1,3) | Base + 54 |
| 251-(2,3) | Base + 55 |
| 251-(3,3) | Base + 56 |
| 252-(0,3) | Base + 57 |
| 252-(1,3) | Base + 58 |
| 253-(0,3) | Base + 59 |
| 250-(0,4) | Base + 60 |
| 250-(1,4) | Base + 61 |
| 250-(2,4) | Base + 62 |
| 250-(3,4) | Base + 63 |
| 250-(4,4) | Base + 64 |
| 250-(5,4) | Base + 65 |
| 250-(6,4) | Base + 66 |
| 250-(7,4) | Base + 67 |
| 251-(0,4) | Base + 68 |
| 251-(1,4) | Base + 69 |
| 251-(2,4) | Base + 70 |
| 251-(3,4) | Base + 71 |
| 252-(0,4) | Base + 72 |
| 252-(1,4) | Base + 73 |
| 253-(0,4) | Base + 74 |
| 250-(0,5) | Base + 75 |
| 250-(1,5) | Base + 76 |
| 250-(2,5) | Base + 77 |
| 250-(3,5) | Base + 78 |
| 250-(4,5) | Base + 79 |
| 250-(5,5) | Base + 80 |

TABLE 3-continued

| Data | Address |
|---|---|
| 250-(6,5) | Base + 81 |
| 250-(7,5) | Base + 82 |
| 251-(0,5) | Base + 83 |
| 251-(1,5) | Base + 84 |
| 251-(2,5) | Base + 85 |
| 251-(3,5) | Base + 86 |
| 252-(0,5) | Base + 87 |
| 252-(1,5) | Base + 88 |
| 253-(5,0) | Base + 89 |
| 250-(0,6) | Base + 90 |
| 250-(1,6) | Base + 91 |
| 250-(2,6) | Base + 92 |
| 250-(3,6) | Base + 93 |
| 250-(4,6) | Base + 94 |
| 250-(5,6) | Base + 95 |
| 250-(6,6) | Base + 96 |
| 250-(7,6) | Base + 97 |
| 251-(0,6) | Base + 98 |
| 251-(1,6) | Base + 99 |
| 251-(2,6) | Base + 100 |
| 251-(3,6) | Base + 101 |
| 252-(0,6) | Base + 102 |
| 252-(1,6) | Base + 103 |
| 253-(0,6) | Base + 104 |
| 250-(0,7) | Base + 105 |
| 250-(1,7) | Base + 106 |
| 250-(2,7) | Base + 107 |
| 250-(3,7) | Base + 108 |
| 250-(4,7) | Base + 109 |
| 250-(5,7) | Base + 110 |
| 250-(6,7) | Base + 111 |
| 250-(7,7) | Base + 112 |
| 251-(0,7) | Base + 113 |
| 251-(1,7) | Base + 114 |
| 251-(2,7) | Base + 115 |
| 251-(3,7) | Base + 116 |
| 252-(0,7) | Base + 117 |
| 252-(1,7) | Base + 118 |
| 253-(0,7) | Base + 119 |
| 254-(0,0) | Base + 120 |
| 254-(1,0) | Base + 121 |
| 254-(2,0) | Base + 122 |
| 254-(3,0) | Base + 123 |
| 254-(4,0) | Base + 124 |
| 254-(5,0) | Base + 125 |
| 254-(6,0) | Base + 126 |
| 254-(7,0) | Base + 127 |
| 260-(0,0) | Base + 128 |
| 260-(1,0) | Base + 129 |
| 260-(2,0) | Base + 130 |
| 260-(3,0) | Base + 131 |
| 261-(0,0) | Base + 132 |
| 261-(1,0) | Base + 133 |
| 262-(0,0) | Base + 134 |
| 254-(0,1) | Base + 135 |
| 254-(1,1) | Base + 136 |
| 254-(2,1) | Base + 137 |
| 254-(3,1) | Base + 138 |
| 254-(4,1) | Base + 139 |
| 254-(5,1) | Base + 140 |
| 254-(6,1) | Base + 141 |
| 254-(7,1) | Base + 142 |
| 260-(0,1) | Base + 143 |
| 260-(1,1) | Base + 144 |
| 260-(2,1) | Base + 145 |
| 260-(3,1) | Base + 146 |
| 261-(0,1) | Base + 147 |
| 261-(1,1) | Base + 148 |
| 262-(0,1) | Base + 149 |
| 254-(0,2) | Base + 150 |
| 254-(1,2) | Base + 151 |
| 254-(2,2) | Base + 152 |
| 254-(3,2) | Base + 153 |
| 254-(4,2) | Base + 154 |
| 254-(5,2) | Base + 155 |
| 254-(6,2) | Base + 156 |
| 254-(7,2) | Base + 157 |

TABLE 3-continued

| Data | Address |
|---|---|
| 260-(0,2) | Base + 158 |
| 260-(1,2) | Base + 159 |
| 260-(2,2) | Base + 160 |
| 260-(3,2) | Base + 161 |
| 261-(0,2) | Base + 162 |
| 261-(1,2) | Base + 163 |
| 262-(0,2) | Base + 164 |
| 254-(0,3) | Base + 165 |
| 254-(1,3) | Base + 166 |
| 254-(2,3) | Base + 167 |
| 254-(3,3) | Base + 168 |
| 254-(4,3) | Base + 169 |
| 254-(5,3) | Base + 170 |
| 254-(6,3) | Base + 171 |
| 254-(7,3) | Base + 172 |
| 260-(0,3) | Base + 173 |
| 260-(1,3) | Base + 174 |
| 260-(2,3) | Base + 175 |
| 260-(3,3) | Base + 176 |
| 261-(0,3) | Base + 177 |
| 261-(1,3) | Base + 178 |
| 262-(0,3) | Base + 179 |
| 255-(0,0) | Base + 180 |
| 255-(1,0) | Base + 181 |
| 255-(2,0) | Base + 182 |
| 255-(3,0) | Base + 183 |
| 255-(4,0) | Base + 184 |
| 255-(5,0) | Base + 185 |
| 255-(6,0) | Base + 186 |
| 255-(7,0) | Base + 187 |
| 263-(0,0) | Base + 188 |
| 263-(1,0) | Base + 189 |
| 263-(2,0) | Base + 190 |
| 263-(3,0) | Base + 191 |
| 270-(0,0) | Base + 192 |
| 270-(1,0) | Base + 193 |
| 271-(0,0) | Base + 194 |
| 255-(1,0) | Base + 195 |
| 255-(1,1) | Base + 196 |
| 255-(2,1) | Base + 197 |
| 255-(3,1) | Base + 198 |
| 255-(4,1) | Base + 199 |
| 255-(5,1) | Base + 200 |
| 255-(6,1) | Base + 201 |
| 255-(7,1) | Base + 202 |
| 263-(0,1) | Base + 203 |
| 263-(1,1) | Base + 204 |
| 263-(2,1) | Base + 205 |
| 263-(3,1) | Base + 206 |
| 270-(0,1) | Base + 207 |
| 270-(1,1) | Base + 208 |
| 271-(0,1) | Base + 209 |
| 256-(0,0) | Base + 210 |
| 256-(1,0) | Base + 211 |
| 256-(2,0) | Base + 212 |
| 256-(3,0) | Base + 213 |
| 256-(4,0) | Base + 214 |
| 256-(5,0) | Base + 215 |
| 256-(6,0) | Base + 216 |
| 256-(7,0) | Base + 217 |
| 264-(0,0) | Base + 218 |
| 264-(1,0) | Base + 219 |
| 264-(2,0) | Base + 220 |
| 264-(3,0) | Base + 221 |
| 272-(0,0) | Base + 222 |
| 272-(1,0) | Base + 223 |
| 280-(0,0) | Base + 224 |

Suppose it is desired to access a texture data in an array of subsampling levels du,dv with coordinates u,v. To determine the linear address for this texture data, the memory addresses occupied by the preceding complete row-spans must be skipped. Furthermore, the memory addresses occupied by the partial row-span of texture data, on the same row v of, and which precede, the texture data to be accessed, must be skipped. The offset which skips over the memory addresses containing the complete preceding row-spans may be determined from the row-span length "RSL" and a total v offset "GV". RSL is given by:

$$RSL = \sum_{i=0}^{ML} 2^i = 2^{ML+1} - 1$$

where
 ML is the maximum level for du and dv.
GV is given by GOV+v where GOV is the global v offset that accounts for complete row-spans of entire groups of arrays that are skipped. Here, v accounts for the skipped complete row-spans within the same group that contains the texture data to be accessed. GOV is given by:

$$GOV = \begin{cases} \sum_{j=ML-dv+1}^{ML} 2^j & \text{if } dv \neq 0 \\ 0 & \text{if } dv = 0 \end{cases}$$

where
 i and j are integer indexes.
The offset for the partial precedent row-span to be skipped is given by GU=GOU+u where "GU" is the total u offset and "GOU" is the global u offset. GOU is given by:

$$GOU = \begin{cases} \sum_{i=ML-du+1}^{ML} 2^i & \text{if } du \neq 0 \\ 0 & \text{if } du = 0 \end{cases}$$

GOU is therefore the sum of the widths of the rows of the skipped arrays in the same group as the accessed texture data. Thus, the linear address of the texture data in the array subsampled at levels du,dv with coordinates (u,v) is given by:

TLA(R)=Base+RSL·GV+GU

Figure 8:
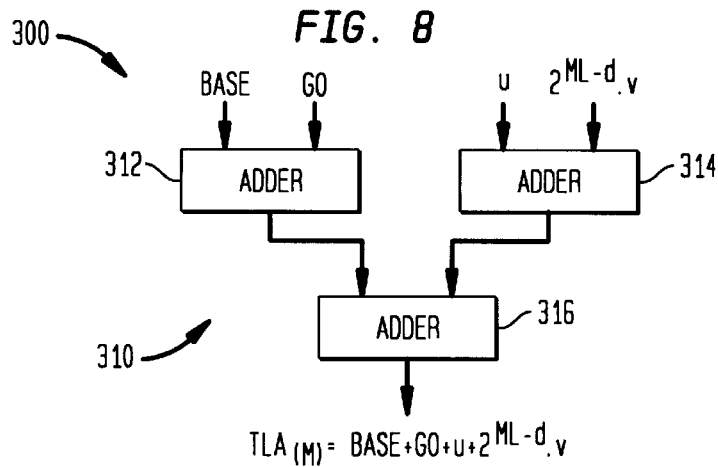
FIG. 8 illustrates an address generator for generating linear addresses for a mip map according to an embodiment of the present invention.

FIG. 8 shows an address generator 300 for generating linear addresses for a mip map that is physically stored in memory as described above. The address generator 300 may form part or all of the address generator 134 shown in FIG. 5. Preliminarily, the drawing processor 132 (FIG. 5) determines the parameters "Base," "GO," "u," and "$2^{ML-d}\cdot v$" using the formulas described above. As shown, the address generator 300 is provided with addition circuitry 310 which may be realized with a two stage adder tree. Specifically, the addition circuitry 310 includes a first adder circuit 312 which receives the base address "Base" and global offset "GO" from the drawing processor 132 (FIG. 5). The adder 312 produces the sum Base+GO. A second adder circuit 314 is provided which operates in parallel to the first adder circuit 312. The second adder circuit 314 receives the parameters "u" and "$2^{ML-d}\cdot v$" from the drawing processor 132 (FIG. 5). The second adder circuit 314 produces the sum $u+2^{ML-d}\cdot v$. These two sums produces by the first and second adder circuits 312, 314 are inputted to a third adder circuit 316. The third adder circuit 316 adds these two sums together to produce the linear address $TLA_{(M)}$=Base+GO+$u+2^{ML-d}\cdot v$. The linear address thus produced may be returned to the drawing processor 132 (FIG. 5) or outputted directly to memory, e.g., the frame buffer 136 (FIG. 5).

Figure 9:
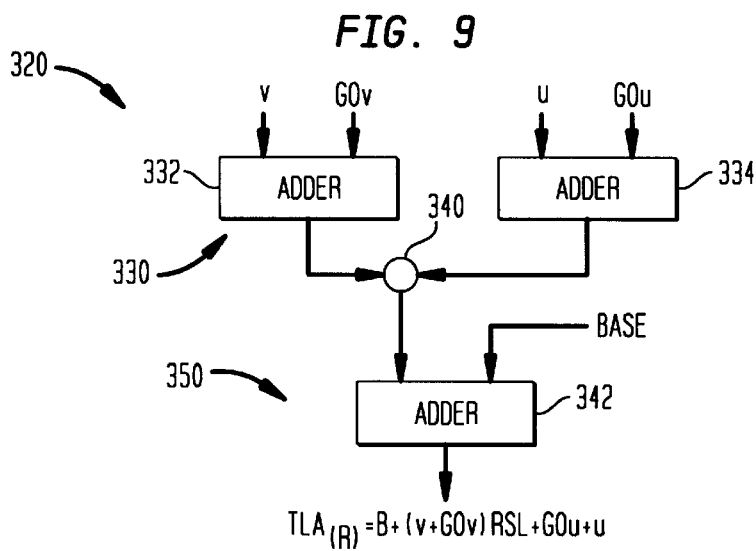
FIG. 9 illustrates an address generator for generating linear addresses for a rip map according to an embodiment of the present invention.

FIG. 9 shows an alternative address generator 320 for generating linear addresses for accessing texture data in the rip map shown in FIG. 7. The address generator 320 includes a first adder stage 330, a concatenator circuit 340 and a second adder stage 350. Preliminarily, the drawing processor 132 (FIG. 5) determines the parameters "Base," "V," "GOV," "u," and "GOU" using the formulas described above. The first adder stage 330 illustratively includes first and second adder circuits 332, 334 which operate in parallel. The first adder circuit 332 receives the parameters v and GOV from the drawing processor 132 (FIG. 5). The first adder circuit 332 adds these parameters together and produces a first sum v+GOV. The second adder circuit 334 receives the parameters u and GOU from the drawing processor 132 (FIG. 5). The second adder circuit 334 adds the parameters together and produces a second sum u+GOU.

The concatenator circuit 340 receives the first and second sums. The concatenator circuit 340 effects the multiplication of the first sum by RSL and addition of the product to the second sum. As noted above, RSL is always $2^{ML+1}\cdot L$. The multiplication can be easily and quickly achieved in the concatenator 340 by left shifting the first sum ML+1 bits and then subtracting the first sum therefrom. However, the subtraction can be omitted due to the cost of hardware implementation. The result is that only a small amount of memory ($2^{ML+2}-1$) is wasted for storing the rip map in memory. The addition can thus be formed by concatenating the left shifted first sum with the second sum. The left shifted first sum would thus form the ML+1 most significant bits (most significant fragment) and the second sum would form the ML least significant bits of the partial concatenated sum (least significant fragment).

The second adder stage 350 is illustratively implemented with an adder circuit 342. The adder circuit 342 receives the concatenated sum outputted by the concatenator circuit 340 and the parameter "Base" from the drawing processor 132 (FIG. 5). The adder circuit 342 adds these two values together to produce the linear address $TLA_{(R)}$=Base+RSL·(GOV+v)+GOU+u. The linear address $TLA_{(R)}$ thus produced may be outputted to the drawing processor 132 (FIG. 5) or directly to memory, e.g., the frame buffer 134 (FIG. 5).

Figure 10:
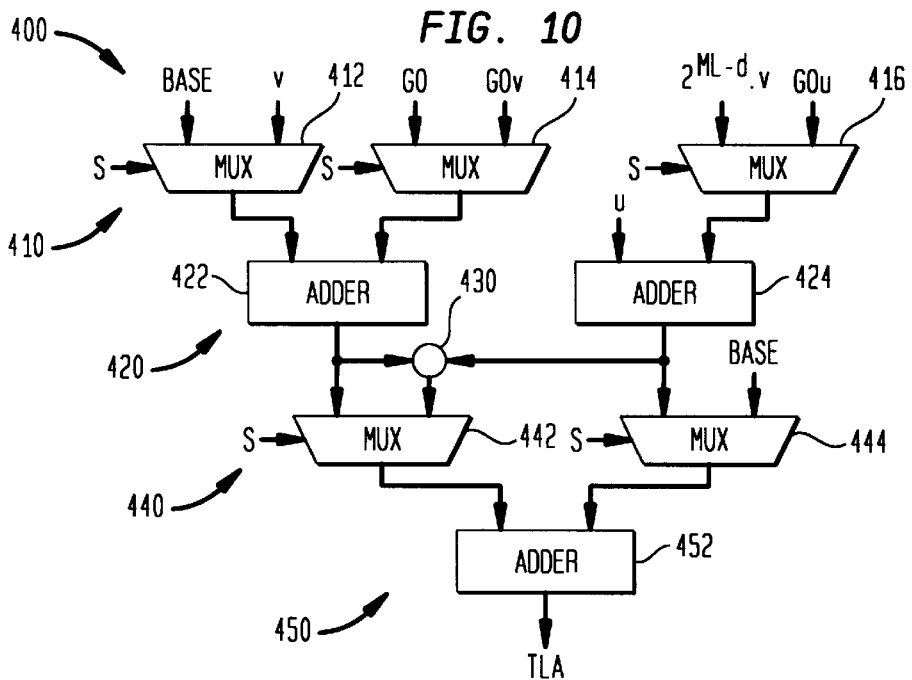
FIG. 10 illustrates a combined mip map/rip map address generator for generating linear addresses according to an embodiment of the present invention.

FIG. 10 illustrates another address generator 400 which can generate linear addresses for either the mip map physically stored in memory as illustrated in FIG. 5 or the rip map physically stored in memory as illustrated in FIG. 6. Preliminarily, the drawing processor 132 (FIG. 5) determines the parameters "Base," "GO," "u," and "$2^{ML-d}\cdot v$" or the parameters "Base," "v," "GOV," "u," and "GOU." Furthermore, the drawing processor 132 (FIG. 5) illustratively also generates a selector control signal S.

The address generator 400 has a first multiplexer stage 410, a first adder stage 420, a concatenator circuit 430, a second multiplexer stage 440 and a second adder stage 450. The first multiplexer stage is illustratively implemented with three multiplexer circuits 412, 414, and 416. The first multiplexer circuit 412 receives from the drawing processor 132 (FIG. 5), as selectable inputs, the parameters Base and v. The second multiplexer circuit 414 receives from the drawing processor 132 (FIG. 5), as selectable inputs, the parameters GO and GOV. The third multiplexer circuit 416 receives from the drawing processor 132 (FIG. 5), as selectable inputs, the parameters $2^{ML-d}\cdot v$ and GOU. Furthermore, the first, second and third multiplexer circuits 412, 414 and 416 receive the selector control signal S from the drawing processor 132 (FIG. 5). In response to the selector control signal S, the multiplexer circuits 412, 414 and 416 select, as first second and third outputs, either Base, GO and $2^{ML-d}\cdot v$, respectively, or v, GOV and GOU respectively. The drawing processor 32 (FIG. 5) generates an appropriate signal S for selecting Base, GO and $2^{ML-d} \cdot v$ for mip map linear address calculation and v, GOV and GOU for rip map linear address calculation.

The adder stage 420 illustratively includes two adder circuits 422 and 424. The adder circuit 422 receives the first and second outputs of the first multiplexer stage 410 and adds them together to produce a first sum. The adder circuit 424 receives the third output and the parameter u (from the drawing processor 132 of FIG. 5) and adds the two together to produce a second sum.

The concatenator 430 receives the second sum and the first sum and concatenates them together in a similar fashion as the concatenator 340 (FIG. 9). The concatenator 430 produces a concatenated sum from the first and second sums.

The second multiplexer stage 440 is illustratively implemented with two multiplexer circuits 442 and 444. The multiplexer 442 receives, as selectable inputs, the first sum and the concatenated sum. The multiplexer 444 receives, as selectable inputs, the second sum and the parameter Base (from the drawing processor 132 of FIG. 5). The multiplexers 442 and 444 also both receive the signal S from the drawing processor 132 (FIG. 5) as a selector control input. In response to the signal S, the multiplexers 442 and 444, select as fourth and fifth outputs, either the first sum and the second sum, respectively, or the concatenated sum and Base, respectively. The drawing processor 132 (FIG. 5) generates an appropriate signal S for selecting the first and second sums for mip map address calculation and for selecting the concatenated sum and Base for rip map address calculation.

The second adder stage 450 is illustratively implemented using an adder circuit 452. The adder circuit 452 receives the fourth and fifth outputs selected by the multiplexer stage 440. The adder circuit adds these two outputs together to produce the linear address TLA.

In short, a linear address organization for physically storing mip maps and rip maps in memory is disclosed. The subsampled data arrays of the mip maps and rip maps are sequentially stored in continuous subsequences of a continuous sequence of memory addresses. The subsequences of addresses are assigned in order of level of subsampling of the data arrays which make up the mip map or rip map. In the case of a mip map, the subsequences are assigned to the data arrays in order of increasing level of subsampling. In the case of rip maps, the data arrays are segregated into groups according to a first one of the two subsampling directions, such that each array in a particular group has the same level of subsampling in the first direction. Subsequences are assigned to each group of data arrays. The addresses of the subsequences are assigned within each group on a span by span basis where a span includes the texture data in a particular direction of each data array in order of increasing level in the second one of the two subsampling directions. Address generators are also provided for assisting in generating linear addresses to texture data with specific coordinates (u,v) in arrays having particular levels of subsampling.

Finally, the above-discussion is intended to be merely illustrative of the invention. Those having ordinary skill in the art may devise numerous alternative embodiments without departing from the spirit and scope of the following claims.

The invention claimed is:

1. A method for storing texture data in a memory comprising:

organizing said texture data into plural arrays of data, including a first data array, containing plural texture data values at a maximum resolution, and other data arrays, each containing a different level of subsampling of said data values of said first data array, and storing said texture data of said plural arrays of data in continuous, subsequences of a continuous sequence of linear memory addresses, such that a first level and a next level of subsampling being retrievable utilizing a same base address, said subsequences being assigned to said texture data of said arrays in order of level of subsampling.

2. The method of claim 1 wherein each data array is a two-dimensional array of textured data.

3. The method of claim 2 wherein said data arrays form a mip map with ML+1 data arrays, where ML is an integer $\geq 1$, wherein each data array is subsampled with the same level of subsampling in each direction of said array, and wherein each of said subsequences of linear addresses is assigned to a respective one of said data arrays in order of increasing level of subsampling.

4. The method of claim 2 wherein said data arrays form a rip map with $(ML+1)^2$ data arrays, where ML is an integer $\geq 1$, each of said data arrays being subsampled at a different combination of first and second levels of subsamplings in first and second directions of said arrays, respectively, wherein said data arrays are divided into groups such that each data array of each one of said groups is subsampled at the same first level of subsampling, in said first direction, wherein each group has at least one span, including one span for each different coordinate value, in said first direction, of a domain of texture data in said group, wherein each span comprises one subsequence of texture data from each data array in said group, arranged in order of increasing second level of subsampling, wherein each of said one subsequences of texture data comprises texture data from a corresponding array, with the same coordinate in said first direction as said span, said texture data being arranged in said one subsequence in order of coordinate value in said second direction, wherein each of said subsequences is assigned to said spans in order of increasing second level of subsampling and order of increasing coordinate in said second direction.

5. The method of claim 3 wherein said texture data of an array with a particular level d of subsampling with two-dimensional coordinate address (u,v) is stored at memory address $TLA_{(M)}$, where $$TLA_{(m)} = Base + LO + GO$$

$$LO = 2^{ML-d} \cdot v + u$$

$$GO = \begin{cases} \sum_{i=ML-d+1}^{ML} 4^i, & \text{if } d \neq 0 \\ 0, & \text{if } d = 0 \end{cases}$$

where Base is a base address in which a first texture data corresponding to coordinates (u=0,v=0) in said first array of level d=0 are stored, and i is an integer index.

6. The method of claim 4 wherein said texture data of an array with a particular level (du,dv) of subsampling with two-dimensional coordinate address (u,v) is stored at memory address $TLA_{(R)}$, where $$TLA_{(R)} = \text{Base} + GO$$

$$GO = (2^{ML+1} - 1)GV + GU$$

$$GU = GOU + u$$

$$GV = GOV + v$$

$$GOU = \begin{cases} \sum_{i=ML-du+1}^{ML} 2^i & \text{if } du \neq 0 \\ 0 & \text{if } du = 0 \end{cases}$$

$$GOV = \begin{cases} \sum_{j=ML-dv+1}^{ML} 2^j & \text{if } dv \neq 0 \\ 0 & \text{if } dv = 0 \end{cases}$$

where Base is a base address in which a first texture data corresponding to coordinates (u=0, v=0) in said first array of level (du=0,dv=0) are stored, and i an j are integer indexes.

7. An apparatus for calculating a linear memory address of a texture data having coordinates (u,v) in a particular level d of subsampling of a mip map, wherein said mip map includes ML+1 arrays of texture data, each with a different level of subsampling 0,1, . . . ,ML, comprising:

adder circuitry for receiving a base address Base, a global offset GO, u and $2^{ML-d^*}v$, for adding Base to GO to produce a first sum, for adding u to $2^{ML-d^*}v$ to produce a second sum, and for adding said first and second sums to produce said linear memory address of said texture data wherein said texture data of each data array are stored in a continuous subsequence of a continuous sequence of linear memory addresses, beginning with address Base, said subsequences being assigned to each data array in order of increasing level d of subsampling, such that a first level and a next level of subsampling being retrievable utilizing said base address Base.

8. The apparatus of claim 7 wherein said global offset GO is given by:

$$GO = \begin{cases} \sum_{i=ML-d+1}^{ML} 4^i, & \text{if } d \neq 0 \\ 0, & \text{if } d = 0 \end{cases}$$

where i is an integer index.

9. An apparatus for calculating a linear memory address of a texture data having 2-D virtual address coordinates (u,v) in a particular level (du,dv) of subsampling of a rip map, wherein said rip map includes (ML+1)² levels of texture data, with different combinations of first and second levels of subsampling (du,dv) in directions of said coordinates u and v, respectively, (0,0), (0,1), . . . , (0,ML), (1,0), (1,1), . . . , (1,ML), (ML,ML), comprising:

a first adder stage for adding v to a first global offset GOV to produce a first sum, and for adding u to a second global offset GOU to produce a second sum, a concatenator circuit, for concatenating said first and second sums to produce a concatenated sum, said first sum forming a most significant fragment of said concatenated sum and said second sum forming a least significant fragment of said concatenated sum, and a second adder stage for adding said concatenated sum to a base address Base to produce said linear address, wherein said data arrays are divided into groups such that each data array of each one of said groups is subsampled at the same first level of subsampling, wherein each group has at least one span, including one span for each different coordinate value, in a first direction, of a domain of said texture data in said group, wherein each span comprises one subsequence of texture data from each data array in said group, arranged in order of increasing second level of subsampling, wherein each of said one subsequences of texture data comprises texture data from a corresponding array, with the same coordinate value in a second direction as said span, said texture data being arranged in said one subsequence of texture data in order of coordinate in said second direction, wherein each of plural continuous subsequences of a continuous subsequence of linear addresses is assigned to said spans in order of increasing second level of subsampling and order of increasing coordinate value in said second direction, such that a first level and a next level of subsampling being retrievable utilizing the same base address.

10. The apparatus of claim 9 wherein GOV and GOU are given by:

$$GOU = \begin{cases} \sum_{i=ML-du+1}^{ML} 2^i & \text{if } du \neq 0 \\ 0 & \text{if } du = 0 \end{cases}$$

$$GOV = \begin{cases} \sum_{j=ML-dv+1}^{ML} 2^j & \text{if } dv \neq 0 \\ 0 & \text{if } dv = 0 \end{cases}$$

where i and i are integer indexes.

11. A method for storing texture data in a memory comprising:

organizing said texture data into plural arrays of data, including a first data array, containing plural texture data values at a maximum resolution, and other data arrays, each containing a different level of subsampling of said data values of said first data array for a first portion of data arrays and a second portion of data arrays, and storing said texture data of said plural arrays of data in continuous, subsequences of a continuous sequence of linear memory addresses, said subsequences being assigned to said texture data of said plural arrays of data in order of level of subsampling, wherein said first portion of data arrays form a mip map with ML+1 data arrays, where ML is an integer $\geq 1$, wherein each of said first portion of data arrays is subsampled with a first level of subsampling in each direction of said array, and wherein each of said subsequences of linear addresses is assigned to a respective one of said first portion of data arrays in order of increasing level of subsampling, wherein said second portion of data arrays form a rip map with (ML+1)² data arrays, where ML is an integer $\geq 1$, each of said second portion of data arrays being subsampled at a different combination of second and third levels of subsamplings in first and second directions of said arrays, respectively, wherein said second portion of data arrays are divided into groups such that each data array of each one of said groups is subsampled at the same second level of subsampling, in said first direction, wherein each group has at least one span, including one span for each different coordinate value, in said first direction, of a domain of texture data in said group, wherein each span comprises one subsequence of texture data from each data array in said group, arranged in order of increasing third level of subsampling, wherein each of said one subsequences of texture data comprises texture data from a corresponding array, with the same coordinate in said first direction as said span, said texture data being arranged in said one subsequence in order of coordinate value in said second direction, wherein each of said subsequences is assigned to said at least one span in order of increasing third level of subsampling and order of increasing coordinate in said second direction.

12. The method of claim 11 wherein said texture data of an array of said first portion of data arrays with a particular level d of subsampling with two-dimensional coordinate address (u,v) is stored at memory address $TLA_{(M)}$, where $$TLA_{(m)} = \text{Base} + LO + GO$$

$$LO = 2^{ML-d} \cdot v + u$$

$$GO = \begin{cases} \sum_{i=ML-d+1}^{ML} 4^i, & \text{if } d \neq 0 \\ 0, & \text{if } d = 0 \end{cases}$$

where Base is a base address in which a first texture data corresponding to coordinates (u=0,v=0) in said first array of level d=0 are stored, and i is an integer index.

13. The method of claim 11 wherein said texture data of an array of said second portion of data arrays with a particular level (du,dv) of subsampling with two-dimensional coordinate address (u,v) is stored at memory address $TLA_{(R)}$, where $$TLA_{(R)} = \text{Base} + GO$$

$$GO = (2^{ML+1} - 1)GV + GU$$

$$GU = GOU + u$$

$$GV = GOV + v$$

$$GOU = \begin{cases} \sum_{i=ML-du+1}^{ML} 2^i & \text{if } du \neq 0 \\ 0 & \text{if } du = 0 \end{cases}$$

$$GOV = \begin{cases} \sum_{j=ML-dv+1}^{ML} 2^j & \text{if } dv \neq 0 \\ 0 & \text{if } dv = 0 \end{cases}$$

where Base is a base address in which a first texture data corresponding to coordinates (u=0, v=0) in said first array of level (du=0,dv=0) are stored, and i an j are integer indexes.

14. The method of claim 1, wherein said first portion and said second portion of said data arrays are stored, such that a first level and a next level of subsampling may be retrieved utilizing same base address.

* * * * *